Figure 1:
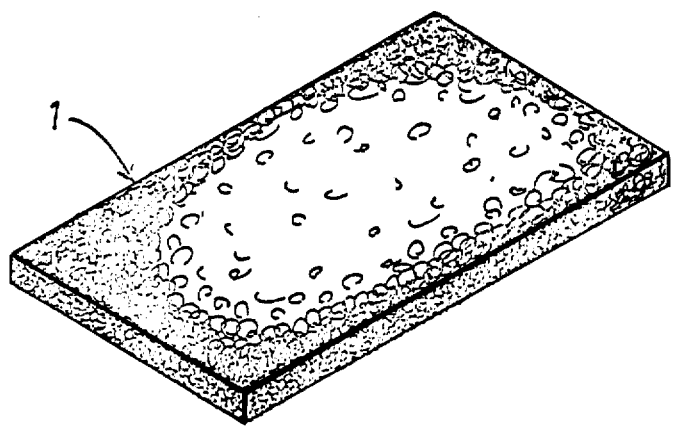

United States Patent [19]

Ogino et al.

[11] 4,411,948
[45] Oct. 25, 1983

[54] AIR FILTER OF THREE-DIMENSIONAL MESH-STRUCTURED WEBS

[75] Inventors: Fumiichi Ogino, Kawanishi; Koji Nakashima, Suita, both of Japan

[73] Assignee: Takeda Chemical Industries, Ltd., Osaka, Japan

[21] Appl. No.: 247,166

[22] Filed: Mar. 24, 1981

Related U.S. Application Data

[63] Continuation of Ser. No. 78,718, Sep. 25, 1979, abandoned.

[30] Foreign Application Priority Data

Apr. 18, 1979 [JP] Japan .............................. 54/48137

[51] Int. Cl.³ ........................................... B32B 5/16
[52] U.S. Cl. .................................... 428/283; 55/524; 55/528; 428/281; 428/282; 428/284; 428/317.9; 428/323; 428/337; 428/367; 428/408; 428/423.1

[58] Field of Search .............. 428/283, 306, 308, 315, 428/323, 331, 408, 423.1, 317.9; 55/524, 528

[56] References Cited

U.S. PATENT DOCUMENTS 4,046,939  9/1977  Hart .................................. 428/408
4,296,166  10/1981  Ogino .............................. 428/283

Primary Examiner—James J. Bell
Attorney, Agent, or Firm—Wegner and Bretschneider

[57] ABSTRACT

Air-cleaning filter element prepared by applying a pressure-sensitive adhesive agent to at least a pair of three-dimensionally mesh-structured elastic-flexible webs, disposing evenly an adsorbent material, such as activated carbon, in a size range of 0.5 mm to 10 mm in diameter between said pair of elastic-flexible webs and pressing the same elastic-flexible webs together as superimposed. The air-cleaning filter element is free from such a deterioration of the adsorbent material as caused by an adhesive and any significant fluid pressure drop on passage of fluid.

7 Claims, 3 Drawing Figures

U.S. Patent  Oct. 25, 1983  4,411,948

AIR FILTER OF THREE-DIMENSIONAL MESH-STRUCTURED WEBS

This application is a continuation of application Ser. No. 78,718, filed Sept. 25, 1979, now abandoned.

This invention relates to an air-cleaning filter element prepared by bonding an adsorbent material to and between a plurality of elastic-flexible webs with an adhesive agent, which has the inherent absorptive performance of said adsorbent.

Heretofore, as filter materials for air cleaner and other uses, adsorbent materials, e.g. activated carbon, have been commonly used as packed in plate-shaped or sigzag-shaped filter housings but the adsorbents tend to give dust on vibration or friction of the housings in the course of transportation or use, thereby soiling the housing. There also are generated gaps in the carbon layer and the resultant "short-cuts" of the fluid to be treated resulted in the failure of the filter to display its expected cleaning performance.

To overcome the above disadvantages, various methods have heretofore been proposed for molding an adsorbent with a binding agent to provide a dimensionally stable adsorbent product. Recently, it has been proposed to place a granular adsorbent in a nonwoven fabric case and seal the case to provide a sealed filter element, or to retain a side of an adsorbent-packed filter element with a spring member so as to prevent generation of gaps.

However, the binding agents heretofore used are disadvantageous in that the solvents contained in such binders tend to drastically reduce the adsorptive capacity of the adsorbent or cause a considerable pressure drop on passage of the fluid. Or the filter housing is of necessity complicated in structure. Thus, the prior art devices have not provided fully satisfactory results.

In view of the foregoing disadvantages, the present inventors conducted intensive studies on the web to be used, the type of binder, molding conditions, etc. and have perfected a method of producing an air-cleaning filter element which is free from a deterioration of the adsorbent material and any significant fluid pressure drop on passage of the fluid.

This invention is therefore concerned with an air-cleaning filter element prepared by applying an adhesive agent to and between at least a pair of three-dimensionally mesh-structured elastic-flexible webs, disposing an adsorbent material, such as activated carbon, in a size range of 0.5 to 10 mm, preferably 1 to 5 mm in diameter, between said elastic-flexible webs and pressing the webs together as superimposed.

The mesh-structured elastic-flexible web to be employed has a three-dimensional skeletal structure which can be attained by selective hydrolysis of a polyurethane foam and which contains 9 to 31 air spaces (hereinafter referred to as cells) per 25 inear millimeters, the number or density of such cells being selected according to the grain size of the activated carbon or other adsorbent employed. Thus, for example, a web having 9 cells/25 linear mm is preferred for the adsorbent having a grain size of 4 to 5 mm and a web having 31 cells/25 mm for non-uniform irregularly shaped adsorbent grains of the order of 1 mm.

As regards the thickness of said mesh-structured elastic-flexible web, a web material of the described type may be sliced or otherwise processed to a thickness suitable for the grain size of carbon to be bonded thereto and the intended application. An appropriate thickness can be selected within the range of 3 to 10 mm.

The adsorbent employed according to this invention may for example be activated carbon, active clay, acid clay, silica, alumina or any of molded or crushed metal oxide catalysts, or a mixture of two or more of such materials, although activated carbon is particularly advantageous. The activated carbon may be one based on coal, petroleum oil distillation residue, wood, fruit shell or the like, provided only that it has a BET specific surface area of 500 to 2000 $m^2$/gram. The adsorbent is normally used as cylindrical, spherical or irregular-shaped grains from 0.5 mm to 10 mm, preferably from 1 mm to 5 mm in diameter.

The adhesive agent employed according to this invention may be of any type if it is able to secure said adsorbent in position on said mesh-structured elastic and flexible web. Thus, solvent-sensitive adhesives, pressure-sensitive adhesives, heat-sensitive adhesives and reaction-sensitive adhesives may be mentioned as examples, although pressure-sensitive adhesives and solvent-sensitive adhesives are particularly desirable.

Such pressure-sensitive adhesive materials are mostly solution-type adhesives using aromatic hydrocarbons (e.g. toluene and xylene) or esters or ketones (e.g. ethyl acetate and acetone) as the solvent components. The solid body components of such adhesives may for example be any of the following materials, or a mixture of two or more of them.

1. Rubber type

Natural rubber and neoprene, chlorinated rubber, SBR NBR, MBR and other synthetic rubbers

2. Cellulose type

Ethyl cellulose, butyl cellulose, benzyl cellulose, nitrocellulose, cellulose acetate and acetic acid, butyric acid and other mixed cellulose esters.

3. Vinyl type

Polyvinyl chloride, polyacrylate ester, polyvinyl ether, polyvinyl acetal, polyisobutylene, ethylene-vinyl acetate copolymer and other materials.

As examples of solvent-sensitive adhesives which are preferably used in the present invention, there are mentioned various synthetic rubber latices which are aqueous emulsion synthetic rubber of $0.03\mu$ to $1.5\mu$ in particle size. The examples of the solid body component of the latices are described below.

(1) Butadiene polymers, or copolymers from butadiene and styrene, styrene derivatives, acrylonitrile, methacrylonitrile, isoprene, isobutylene, etc.

(2) Copolymers from isoprene and styrene, styrene derivatives, etc.

(3) Chloroprene polymers, or copolymers from chloroprene and styrene, styrene derivatives, acrylonitrile, isoprene, etc.

(4) Copolymers from acrylates and styrene, styrene derivatives, vinyl chloride, vinyl acetate, acrylonitrile and methacrylate.

(5) Methacrylonitrile polymers, and copolymers from methacrylonitrile and styrene, etc.

(6) Vinyl acetate polymers and vinyl chloride polymers.

Also usable are the above latices having been carboxy-modified or suitably modified in other ways.

These latices may be an aqueous emulsion obtained mainly from emulsion polymerization, and are used, with the resin solid content adjusted to 20 to 50% and preferably, 35 to 45%.

The present air-cleaning filter element can be prepared by the steps of applying said adhesive agent to mesh-structured elastic-flexible webs, disposing the adsorbent over the coated surfaces of said webs and bonding the webs together by the application of pressure.

The application of the adhesive agent to elastic-flexible webs can be accomplished by direct brushing, roller- or calender-coating, spray-coating or any other suitable procedure. It is, however, more desirable to take the steps of coating a release paper with the adhesive by brushing, roller-coating, spray-coating or the like, pressing the paper against the elastic-flexible web in face-to-face relationship and, then, peeling off the release paper to let the adhesive be transferred from the release paper to the surface of the elastic-flexible web.

While the amount of adhesive should vary with its type, the amount as solid matter thereof can be selected from the range of 5 g. to 550 g. per square meter of web. For example, the pressure-sensitive adhesives can usually be used in an amount ranging from 5 g/m$^2$ to 250 g/m$^2$ as solid matter thereof, preferably from 10 g/m$^2$ to 200 g/m$^2$, and the synthetic rubber latex can usually be used in an amount ranging from 100 g/m$^2$ to 500 g/m$^2$ as solid matter thereof, preferably 250 g/m$^2$ to 500 g/m$^2$.

With a smaller amount of adhesive, the carbon cannot be effectively locked in position on the web, and with an excess of adhesive, the open cells of webs are covered with the adhesive to cause an undesirably great pressure drop on passage of fluid.

When the adhesive contains a solvent, the solvent should be evaporated off prior to deposition of the adsorbent, for otherwise the solvent will be adsorbed on the adhesive to interfere with the latter's adsorptive ability. When the application of adhesive to the elastic-flexible web is performed through a release paper, the evaporation of solvent may take place after the application of adhesive to the release paper and before the pressing of the paper against the web, or after joining and before peeling-off or thereafter. The solvent evaporation may be accomplished either by allowing the material to stand at ambient temperature and pressure or, if necessary, at elevated temperature and/or pressure. The deposition of the adsorbent on the elastic-flexible web may be accomplished by a suitable procedure, e.g. by hand or by mechanical vibrations. While the deposition amount of adsorbent is optional according to the intended application, it is normally 200 to 2500 grams per square meter of the web.

The bonding of carbon to the adhesive-coated webs can be accomplished by supporting the webs between wood, plastic, metal or other plates and applying an external load of 0.01 to 0.02 kg/cm$^2$.

There are cases in which the edges of thus-formed filter element are heat-sealed.

The air-cleaning filter element according to the present invention may be one prepared by using not less than 3 sheets of elastic-flexible webs. For example, in case of using 5 sheets of webs (A), (B), (C), (D) and (E) as superimposed in the order mentioned, adsorbent is fixed in each space between webs, which are neighboring each other, i.e. the space between webs A and (B), the space between webs (B) and (C), the space between webs (C) and (D), and the space between webs D and E . The adsorbent in each space of the webs is bonded to two webs existing both sides of the adsorbent. In this case, the adhesive agent may be different in kind in each layer of adhesive agent. It is preferable to use a pressure-sensitive adhesive agent in order to bond the interior webs (B), (C), (D) to adsorbents and to use another adhesive agent other than pressure-sensitive adsorbent, such as synthetic rubber latex, in order to bond the outer side webs (A) and (E) with adsorbent.

The following examples are further illustrative of this invention.

EXAMPLE 1

An elastic-flexible web was applied by brushes with an adhesive agent at an application rate as resin solids of 350 g/m$^2$, followed by scattering uniformly activated carbon on the surface at a rate of 3 l/m$^2$, then overlapped by the elastic-flexible web applied with an adhesive agent in the similar manner, and put between plates to be allowed to stand at ambient temperature for 10 hours under load of 0.01 kg/cm$^2$ applied. Among the materials hereby used, the elastic-flexible web was one having a size (15 cm × 30 cm × 5 mm (thickness)) and a standard cell number of 9 pieces/25 mm, while the activated carbon was cylindrical-formed one showing 1180 m$^2$/g in BET specific surface area, 4 to 6 mesh in grain size (4 mm in average particle size), and 450 g/l in packing density, with the adhesive agent as indicated in Table 1.

TABLE 1

| Sample No. | Type and solid content of latices used | (%) |
|---|---|---|
| 1 | Carboxy-modified SBR | 47 |
| 2 | Carboxy-modified MBR | 48 |
| 3 | Polyvinyl acetate | 50 |
| 4 | NBR | 45 |
| 5 | Copolymer from acrylic acid ester | 45 |

With the filter materials produced in this way, performance testing was carried out in accordance with the following methods, along with the obtained results shown in Table 1:

1. Pressure loss

The filter element was cut into a disc 66 mm across and placed in a column of the same inside diameter. Dry air at room temperature was introduced into the column at a linear flow rate of 0.5 to 2 m/sec. and the linear flow rate of the effluent air was measured with an electronic anemometer for pressure drop determination.

2. Acetone adsorption rate

The filter element was cut into a disc 66 mm across and fitted into an adsorption column. A gas containing about 1.0 vol.% of acetone in a gas holder was circulated to the adsorption column at a linear flow rate of 15 cm/sec. and the adsorption rate was determined from the time when the acetone concentration had reached one-tenth of its initial concentration.

3. Acetone equilibrial adsorption

The filter element was cut into a disc-shaped piece 66 mm across and, in accordance with JIS K-1474, the equilibrial adsorption of acetone with an initial concentration of 1000 ppm was determined.

TABLE 2

| Sample No. | Pressure loss mm aq. lm/sec | Acetone adsorption rate, min | Acetone equilibrial adsorption, g/100 cm² filter |
|---|---|---|---|
| 1 | 0.5 | 8.0 | 4.3 |
| 2 | 0.7 | 7.5 | 4.3 |
| 3 | 0.9 | 11.0 | 4.0 |
| 4 | 0.7 | 8.0 | 4.2 |
| 5 | 0.8 | 9.0 | 4.1 |
| Unfabricated | 0.6 | 7.0 | 4.3 |

EXAMPLE 2

By varying the application amount of a synthetic rubber latex (carboxy-modified SBR latex), in the same procedure as described in Example 1, filter materials were produced to carry out the performance testing as mentioned in Example 1, to obtain the results shown in Table 3.

TABLE 3

| Sample No. | Application amount of latex | Pressure loss mmaq. lm/sec | Acetone adsorption rate, min | Acetone equilibrial adsorption, g/100 cm² filter |
|---|---|---|---|---|
| 6 | 300 | 0.7 | 8.0 | 4.2 |
| 7 | 400 | 0.7 | 7.5 | 4.3 |
| 8 | 500 | 1.2 | 12.0 | 4.2 |
| 9 | 600 | 25.6 | 21.0 | 4.0 |
| Unfabricated | — | 0.6 | 7.0 | 4.3 |

Reference Example 1

In accordance with the same procedure as described in Example 1, and by crushing the cylindrical-formed activated carbon as used in Examle 1 to a uniform grain size of 24 to 48 mesh (average particle size of 0.42 mm), by the use of a carboxy-modified SBR latex as an adhesive agent and an elastic-flexible web of 50 pieces/25 mm in standard cell number as a mesh-structure elastic-flexible one, with the application amount of the adhesive agent of 400 g (solids)/m², a filter was produced to determine the pressure drop and equilibrium adsorption quantity for acetone, as being indicated in the following:

Pressure loss; (at a flow rate of 1 m/sec as a linear flow rate) 75.6 mm aq.

Acetone equilibrial adsorption; (2.0 g/100 cm²-filter)

EXAMPLE 3

By means of a coating brush, an elastic-flexible web having 9 cells/25 mm (standard number)(size 25 cm×25 cm×5 mm (thickness)) was coated with 25 g/m² (as solid resin content) of a vinyl pressure-sensitive adhesive (Composition: butyl methacrylate/ethylene-vinyl acetate copolymer as dissolved in toluene-ethyl acetate; nonvolatile matter 25 wt. %) After application of a release paper, the web was dried in an oven at 80° C. for 30 minutes, after which time it was taken out and allowed to cool. The elastic web was peeled off the release paper. Then, cylindrical activated carbon pellets (BET specific surface area 1180 m²/g, grain size 4 to 6 meshes, packing density 450 g/l) were evenly deposited on the coated web at the rate of 3 l/m². Another elastic web, similarly coated with the same adhesive, was superimposed on the above web and the assembly was placed between a pair of plates and a load of 0.01 kg/cm² was applied to the plates from behind to join the webs and carbon together under pressure. By the above procedure was obtained a filter element according to this invention.

The following performance tests on the above filter element were carried out by the same manner as in Example 1. The results are shown in Table 4.

TABLE 4

| Sample No. | Pressure loss* (mm, water) | Acetone adsorption rate (min.) | Acetone equilibrial adsorption (g/100 cm² filter) |
|---|---|---|---|
| 10 | 0.6 | 9.0 | 2.15 |
| Unfabricated | 0.6 | 8.5 | 2.15 |

*Pressure loss at a flow rate of 1 m/sec.

EXAMPLE 4

In the same manner as Example 3, filter elements were produced using various amounts of vinyl pressure-sensitive adhesive and a pressure loss test was performed on each of the filter elements. The results are set forth in Table 5.

TABLE 5

| Sample No. | Amount of adhesive (g/m²) | Pressure loss* (mm, water) |
|---|---|---|
| 11 | 10 | 0.6 |
| 12 | 50 | 0.6 |
| 13 | 100 | 0.7 |
| 14 | 200 | 1.5 |
| 15 | 300 | 31.0 |
| Unfabricated | — | 0.6 |

*Pressure loss at the flow rate of 1 m/sec.

Figure 2:
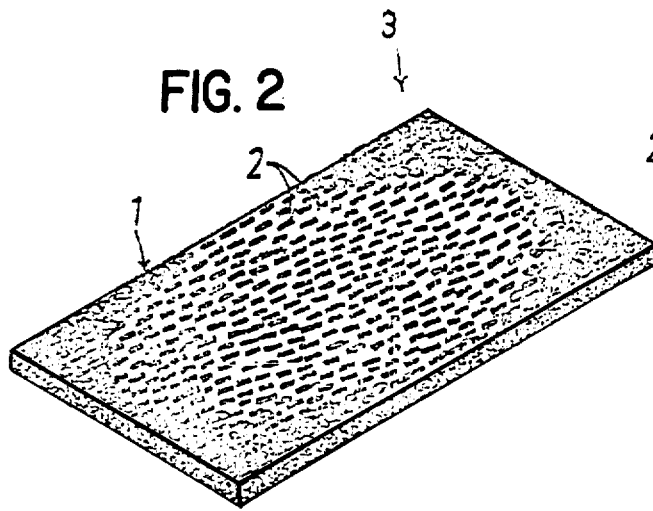
Figure 3:
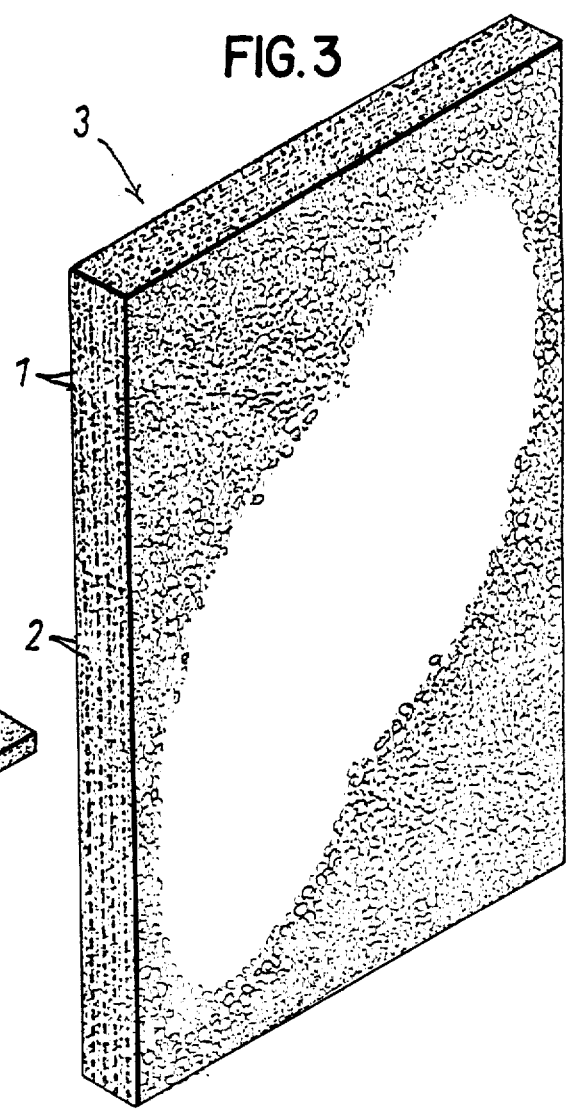

The drawings show the embodiments of the air filter of the present invention. FIG. 1 is a partially exploded perspective view of the three-dimensionally mesh-structured elastic-flexible web. FIG. 2 and FIG. 3 are partially exploded perspective views of the air filter of the present invention, respectively. FIG. 2 is directed to the present air filter comprising two sheets of the three-dimensionally mesh-structured elastic-flexible web and one layer of activated carbon existing between the two sheets of web. FIG. 3 is directed to the present air filter comprising five sheets of web and four layers of activated carbon, each layer existing between one each sheet of web and another sheet of web.

1: three-dimensionally mesh-structured elastic-flexible web.
2: activated carbon
3: the present air filter

What is claimed is:

1. Air-cleaning filter element which comprises at least two sheets of three-dimensionally mesh-structured elastic-flexible webs of skeletal structure containing 9 to 31 air spaces per 25 linear mm and having 3 mm to 10 mm thickness as superimposed and activated carbon adsorbent of a grain size of 1 to 5 mm in diameter which is bonded to and between the webs with a pressure-sensitive adhesive, the amount of activated carbon adsorbent deposited being 200 to 2500 g. per m² of web.

2. Air-cleaning filter element as claimed in claim 1, wherein the pressure-sensitive adhesive is used in an amount ranging from 5 g. to 250 g. per square meter of web.

3. Air-cleaning filter element as claimed in claim 1, wherein the pressure-sensitive adhesive is used in an amount ranging from 10 g. to 200 g. per square meter of web.

4. Air-cleaning filter element as claimed in claim 1, wherein not less than 3 sheets of the webs are employed.

5. Air-cleaning filter element as claimed in claim 4, wherein the interior web or webs are bonded to adsorbent with a pressure-sensitive adhesive and each of the outer side webs is bonded to adsorbent with adhesive agent other than pressure-sensitive adhesive.

6. Air-cleaning filter element as claimed in claim 5, wherein each of the outer side webs is bonded to adsorbent with a synthetic rubber latex.

7. A method for preparing an air-cleaning filter element which comprises at least two sheets of three-dimensionally mesh structured elastic-flexible webs of skeletal structure containing 9 to 31 air spaces per 25 linear mm and having 3 mm to 10 mm thickness as superimposed, which method comprises
 (1) applying a synthetic rubber latex to and between at least two of the said sheets of elastic-flexible webs,
 (2) disposing between the said webs per $m^2$ of web 200 to 2500 g. of activated carbon adsorbent of a grain size of 1 to 5 mm diameter and
 (3) pressing the webs together as superimposed.

* * * * *